Inventor
GEORGE W. BINNS
CLEMENT BOOTH
By HK Parsons
Attorney

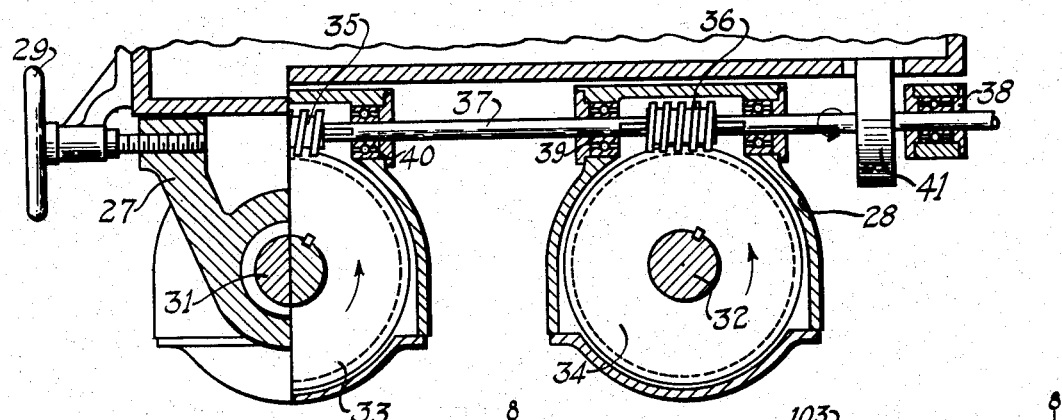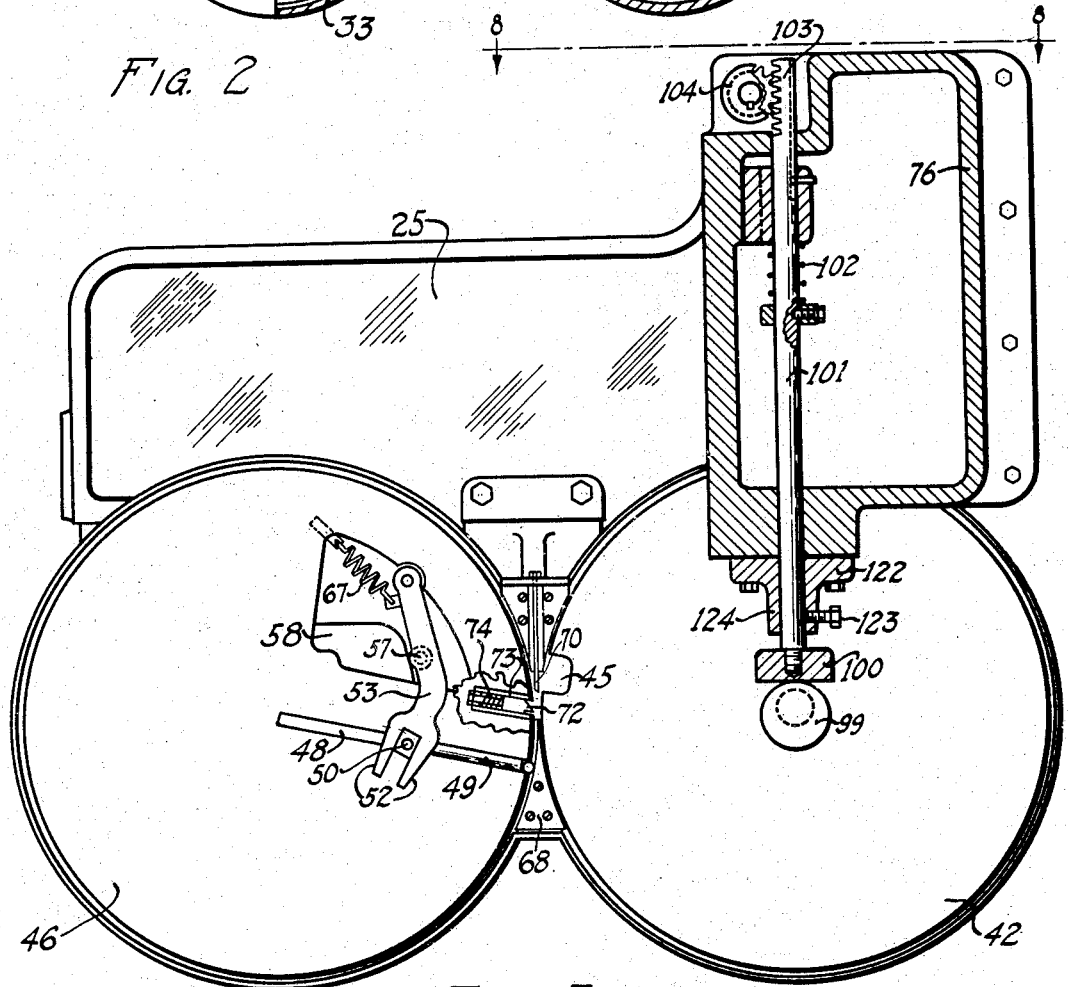

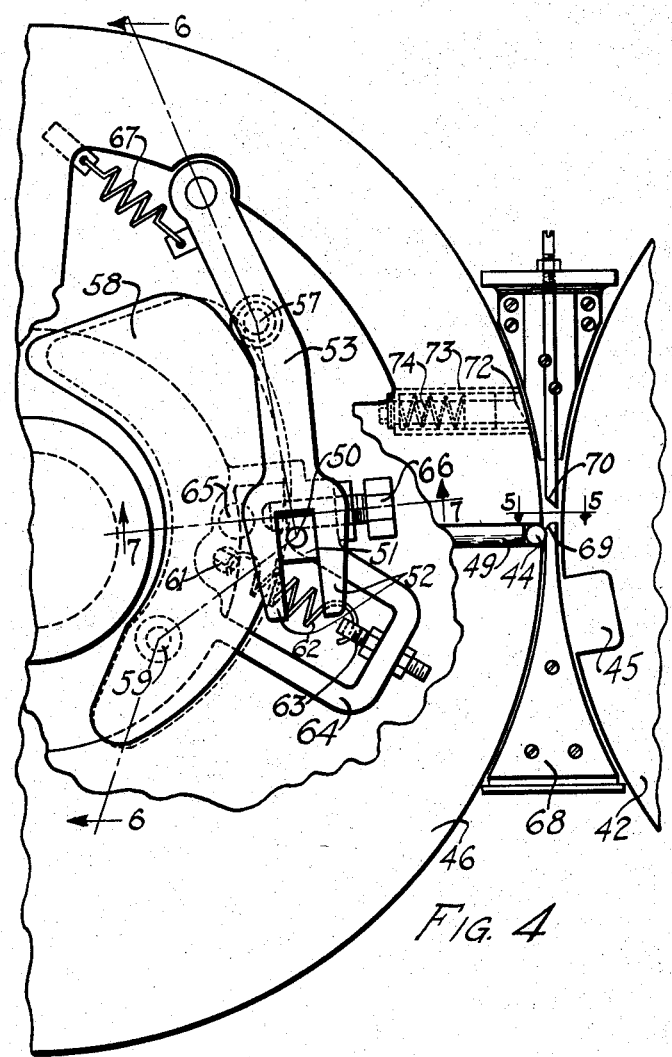
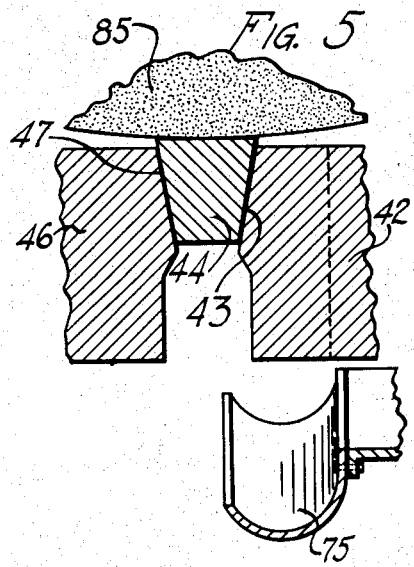
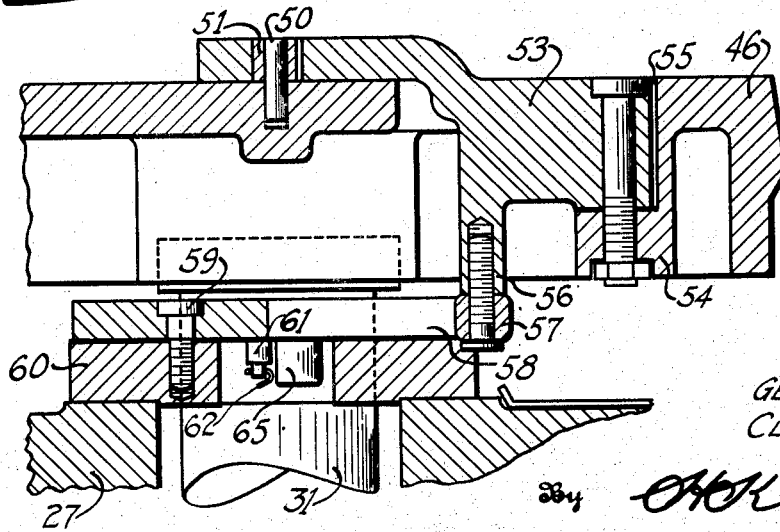

Jan. 6, 1931.  G. W. BINNS ET AL  1,788,046
ROLL END GRINDER
Filed Jan. 22, 1929  6 Sheets-Sheet 4

Inventor
GEORGE W. BINNS
CLEMENT BOOTH
By HK Parsons
Attorney

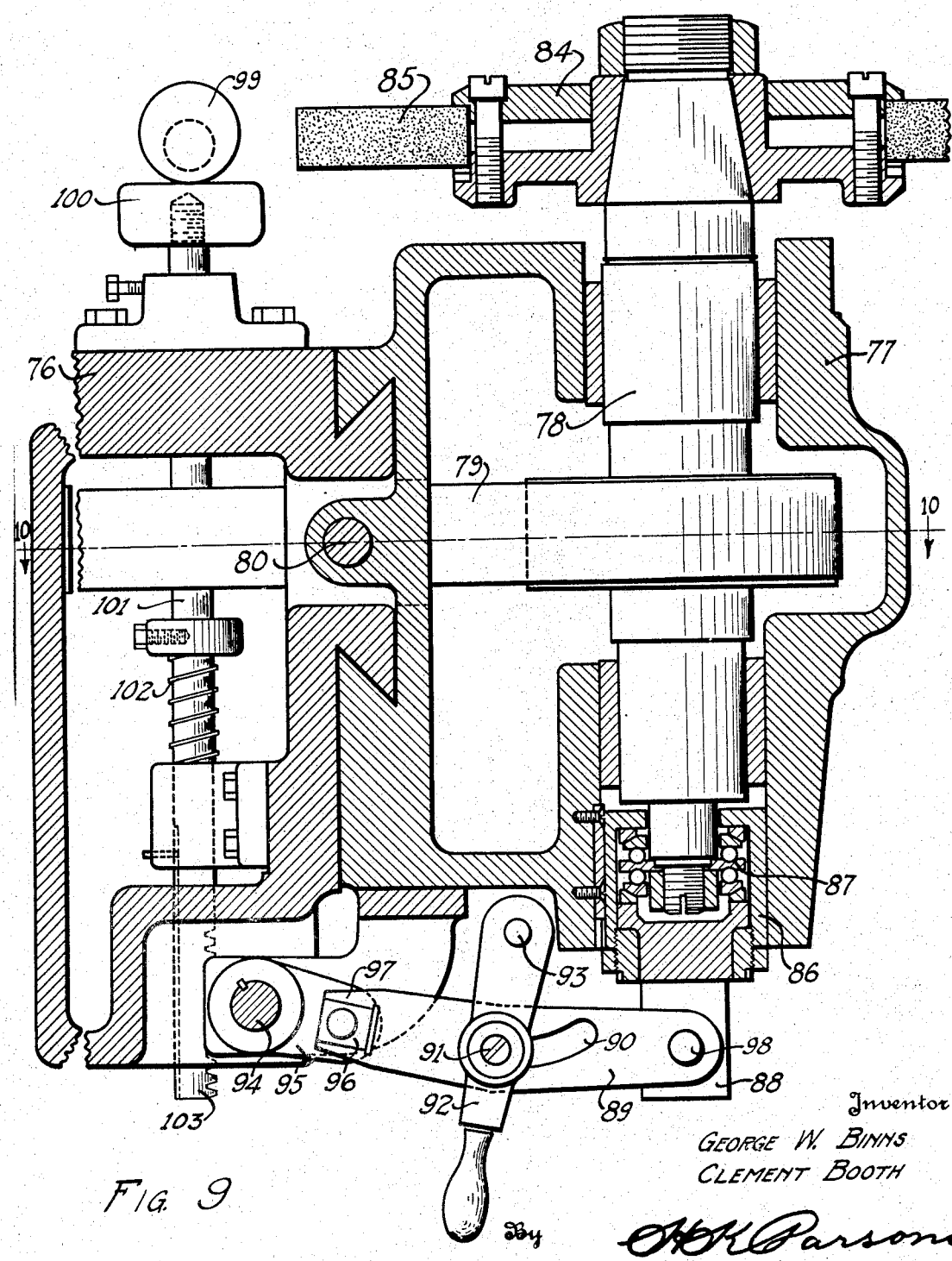

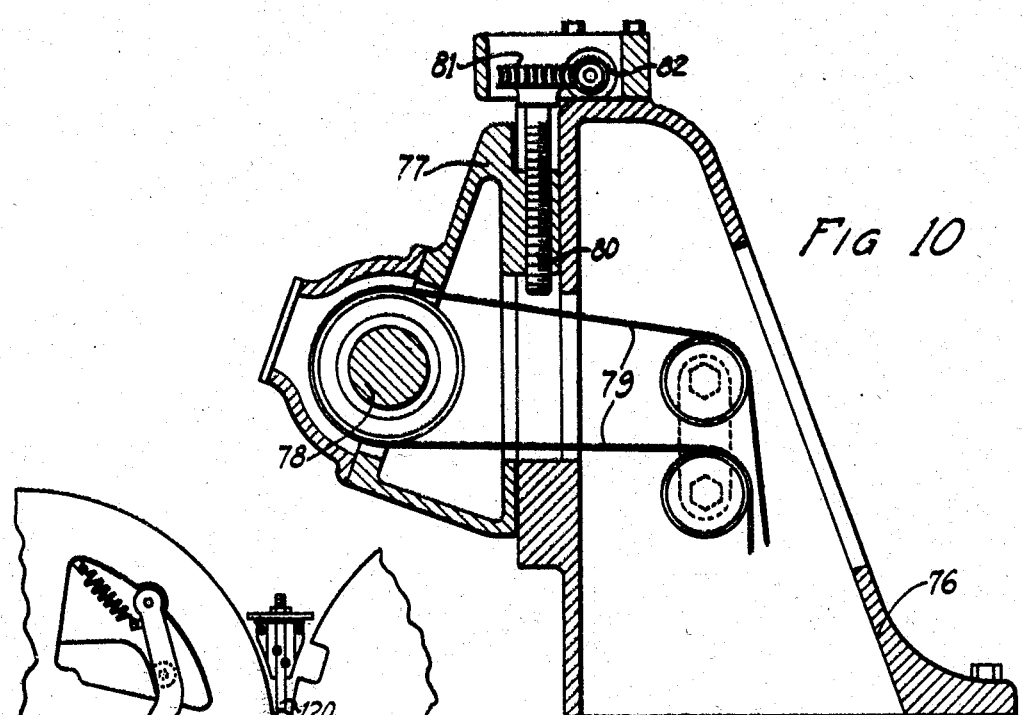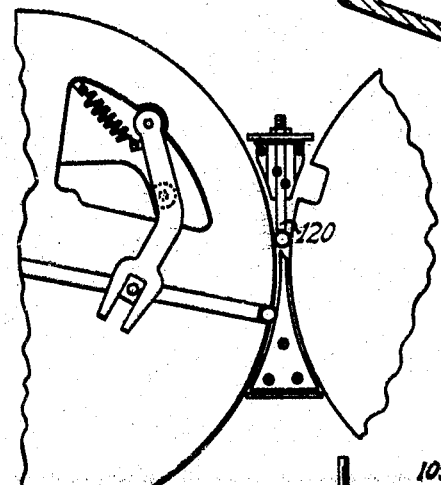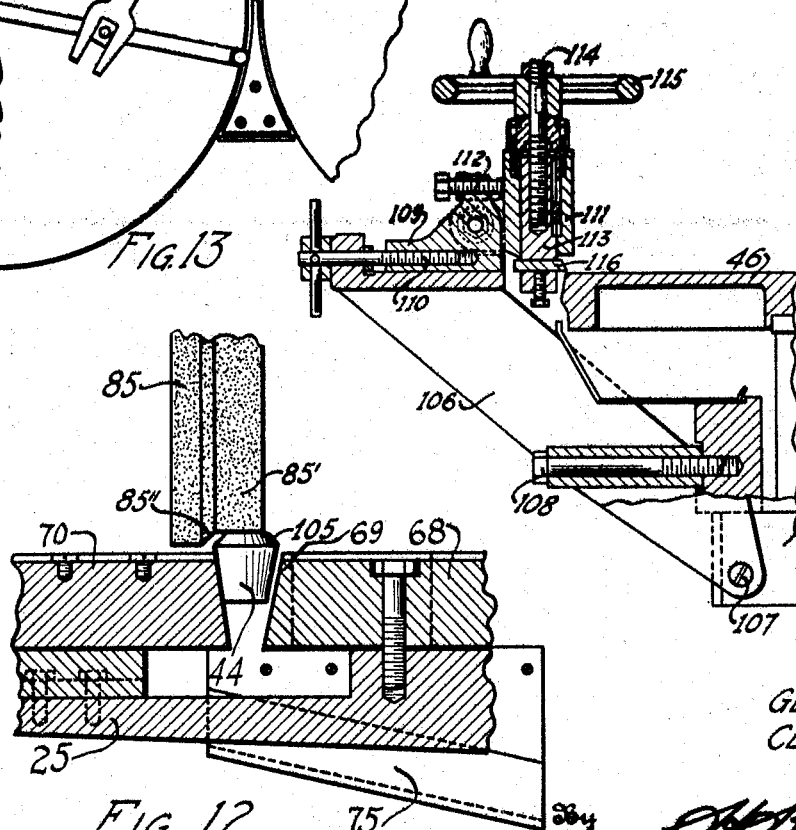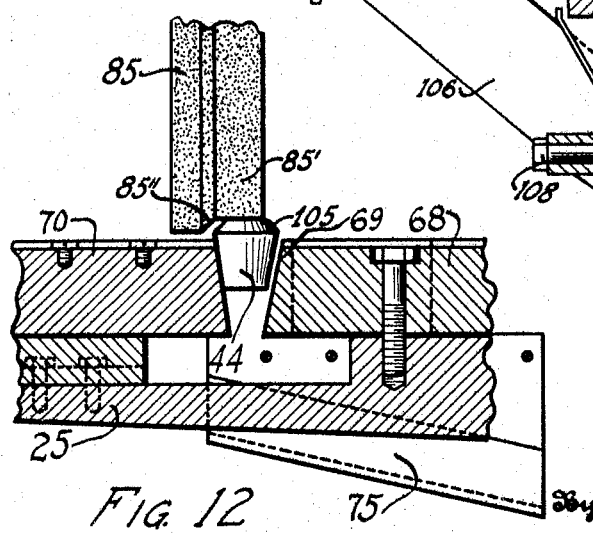

Patented Jan. 6, 1931

1,788,046

UNITED STATES PATENT OFFICE

GEORGE W. BINNS AND CLEMENT BOOTH, OF CINCINNATI, OHIO, ASSIGNORS TO CINCINNATI GRINDERS INCORPORATED, OF CINCINNATI, OHIO, A CORPORATION OF OHIO

ROLL-END GRINDER

Application filed January 22, 1929. Serial No. 334,199½.

This invention relates to improvements in grinding machinery and has particular reference to a machine adapted for use in grinding the terminal portions of rolls or other like articles.

One of the principal objects of the present invention is the provision of a machine which will make possible the accurate grinding of a terminal portion of various articles such as rolls for antifriction bearings without the use of chucks or like holding fixtures.

A further object of the invention is the provision of a machine which will automatically, accurately position and hold the article to be operated upon in such manner that the surface produced by the grinding operation will be located in accurate and definite relation to the body portion of the article.

A further object of the invention is the provision of a machine particularly adapted for use in formation of the end terminus or seat engaging portion of a tapered roll which will produce a series of rolls each having the terminal face thereof in definite spaced relation to a pre-determined diameter of the roll whereby the several rolls may be mounted in a single bearing with their position relative to the bearing determined by said formed termini and the races in which the rolls are mounted will bear with equal pressure upon all of the rolls equally distributing the bearing load or strain and consequently providing a bearing of maximum life and efficiency.

An additional object of the invention is the provision of an improved machine in which the articles will be automatically introduced, properly located and supported during grinding and automatically ejected at a predetermined point in the cycle of operations of the machine and in which the grinding performance will be substantially continuous and idle time necessary for introduction and ejection of work will be reduced to a minimum.

A further object of the invention is the provision of a machine which may be utilized for the production of either flat or form terminal surfaces as may be preferred. Other objects and advantages of the present invention should be readily apparent by reference to the following specification considered in conjunction with the accompanying drawings forming a part thereof and it will be understood that we may make any modifications in the specific structural details herein shown and described within the scope of appended claims without departing from or exceeding the spirit of the invention.

Figure 2 is a section through the work controlling spindles and adjusting mechanism therefor on line 2—2 of Figure 1.

Figure 3 is a plan view of the work supporting and controlling mechanisms with the machine column shown in section as on line 3—3 of Figure 1.

Figure 4 is an enlarged fragmentary plan view of the work carrying and introducing disc with parts broken away to illustrate the actuating means for the work introducing and ejector mechanisms.

Figure 5 is a fragmentary section through the work as on line 5—5 of Figure 4 showing the grinding wheel engagement therewith.

Figure 6 is a fragmentary sectional view taken on line 6—6 of Figure 4.

Figure 9 is a horizontal section taken on line 9—9 of Figure 8 illustrating the wheel oscillating and adjusting mechanism.

Figure 10 is a fragmentary section through the column portion showing the wheel spindle adjustment and drive as on line 10—10 of Figure 9.

Figure 11 is a fragmentary section through the work controlling disc truing mechanism taken as on line 11—11 of Figure 1.

Figure 12 is a section taken at right angles to Figure 5 illustrating the use of a formed grinding wheel intended to produce a combined flat and tapered portion on the terminus of the work, and, Figure 13 is a fragmentary plan view showing a slightly different arrangement of grinding discs and relative positioning of the work rest blade.

Figure 1:
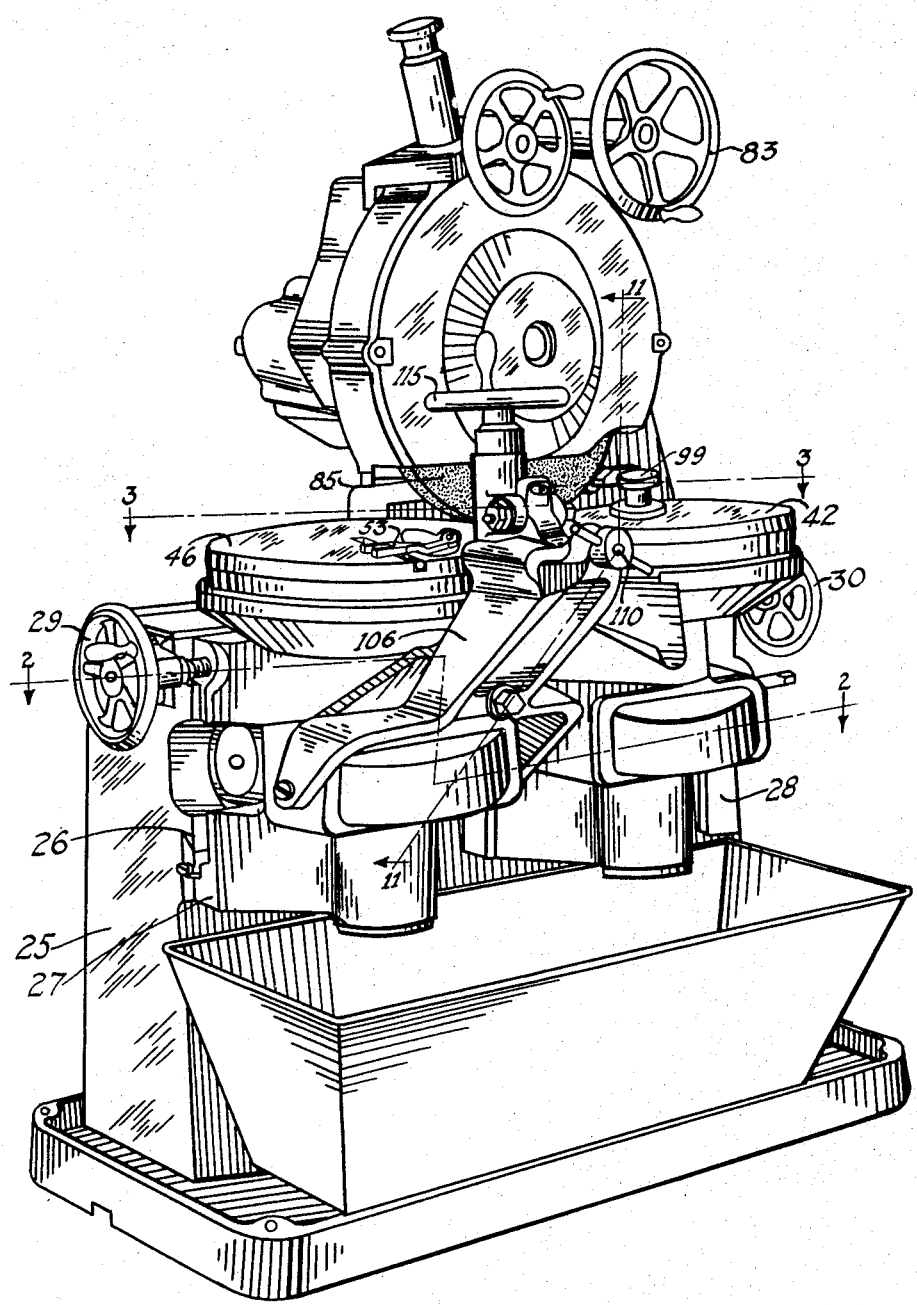
Figure 1 is a perspective view of one embodiment of the invention.
Figure 7:
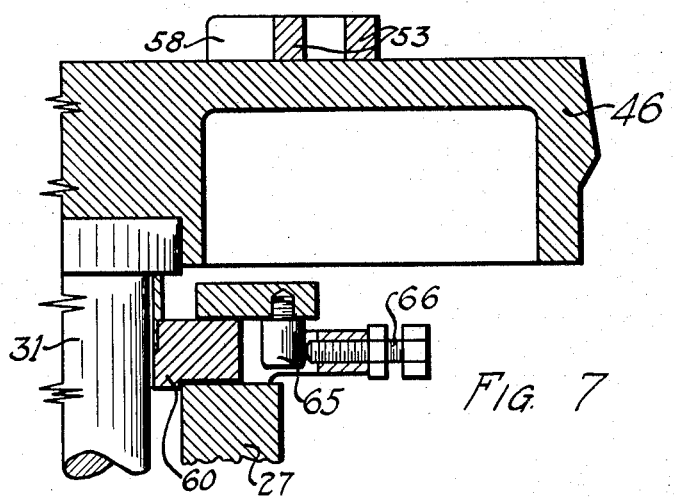
Figure 7 is a similar fragmentary sectional view on line 7—7 of Figure 4 illustrating the stop for limiting outward movement of the injector actuating cam.
Figure 8:
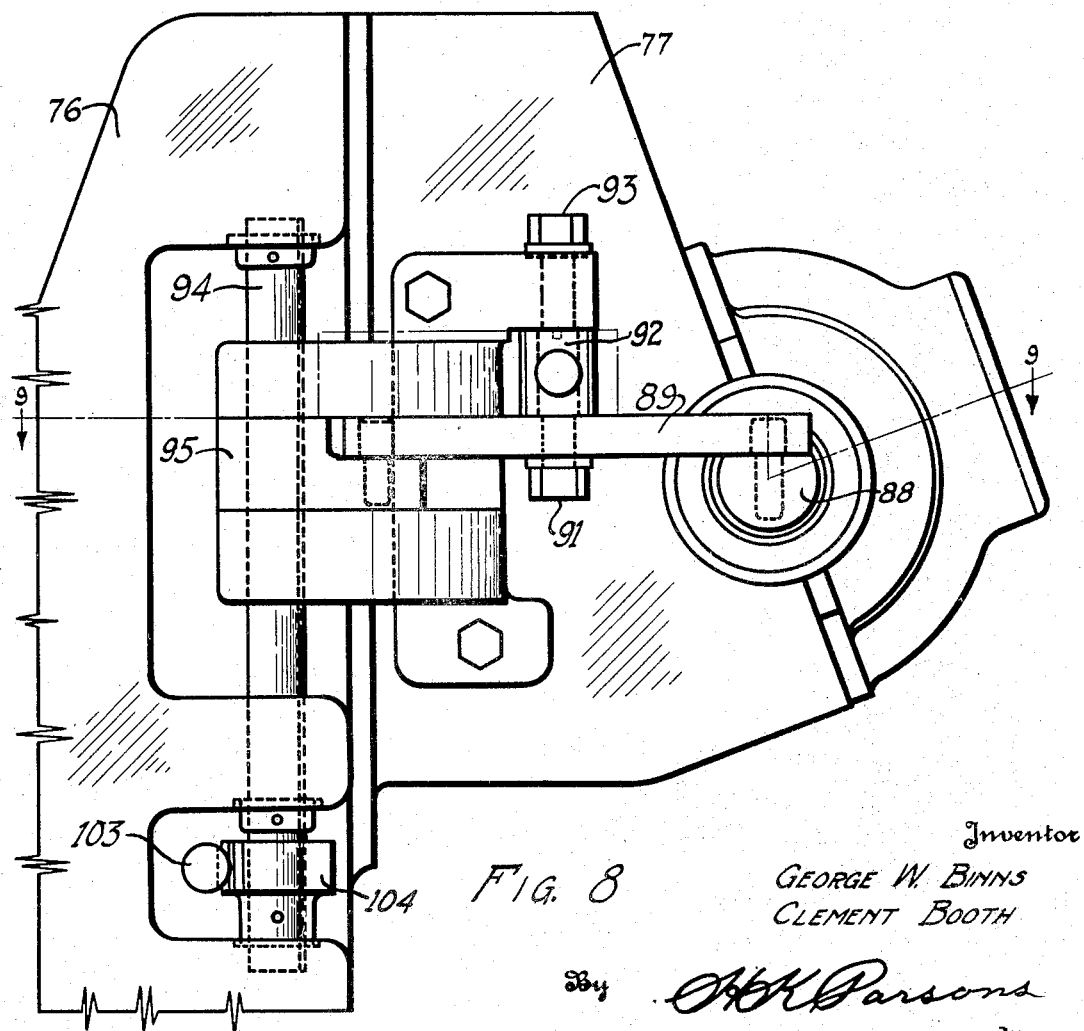
Figure 8 is a rear view of the column portion of the machine and wheel oscillating mechanism carried thereby.

In the drawings the numeral 25 designates the bed of the machine having the ways 26 bearing the left hand slide 27 and right hand slide 28.

These slides are respectively adjustable longitudinally of the ways or transversely of the bed by hand wheels 29 and 30. Slide 27 has journaled therein the vertical spindle 31 and slide 28 the spindle 32. These spindles are respectively provided with worm gears 33 and 34 meshing with worms 35 and 36 which are splined on drive shaft 37 journaled in bearing 38 carried by the bed and slidably engaged within the anti-friction bearings 39 and 40 of slides 28 and 27 respectively. This shaft may be suitably driven as by power applied to pulley 41 thereon.

The foregoing construction renders it possible to impart limited back and forward individual movement to the slide members, the worm riding with its adjacent worm gear and the timing of drive of the parts being unaffected by said lateral adjustment. It will be noted that in the form of construction shown shaft 37 is rotated in the direction of the arrow shown in Figure 2 whereby shaft 31 and shaft 32 are each rotated in a counter clock-wise direction.

Carried by the upper end of shaft 32 is the work controlling disc 42 having a lateral surface of suitable figurations formed thereon to conform to and frictionally engage the work piece surface. In the present instance this surface has been shown at 43 as having a taper corresponding to that of the frusto-conical tapered roll 44 to be supported thereby.

The surface is interrupted as by the notch 45 to facilitate ejection of a finished work piece. Shaft 31 bears a second work controlling disc 46 having a corresponding beveled surface 47 disposed in peripheral opposition to the surface 43 so that when work piece 44 is in position and jointly engaged by surfaces 43 and 47 it will spin about a vertical axis.

Disc 46 carries the work introducing and ejecting mechanism which will now be described, particular reference being made to Figures 3 and 4 of the drawings.

Formed in the upper face of disc 46 is a radially extending groove or slot 48 for plunger 49 coupled by pin 50 with slide block 51 riding on the upper surface of disc 46 and received between the furcations 52 of rock lever 53. This lever as particularly shown in Figure 6 is pivoted to ear 54 partially subtending the segmental shaped aperture 55 in disc 46 and has a depending portion 56 bearing an anti-friction roller 57 for engagement with the actuating cam 58. This cam is supported on pivot 59 secured to plate 60 carried by the bracket 27 and surrounding shaft 31. The cam has on its under side a pin 61 engaged by one end of tension spring 62 whose other end is adjustably connected by screw 63 with bracket 64 on plate 60.

Adjustment of the position of the screw serves to vary the tension of the spring and thus the outward urge of the main portion of the cam as respects its pivot 59. An abutment 65 on the under side of the cam by contact with adjustable stop screw 66 on plate 60 serves to limit this resiliently actuated outward movement of the cam. In operation, as disc 46 is rotated bringing slot 48 toward the inner side of the machine or in opposition to disc 42, roller 57 will reach the low portion of the cam and continue there-around in engagement therewith. Prior to this movement and while the lever and slide block 51 are held in their inner position by action of spring 67 the work piece 44 has been placed in slot 48 adjacent injector plunger 49 as shown in Figure 3 for example.

As the disc continues to rotate with roller 57 in contact with the cam and past the center of pivotance of the cam member, the rise of the cam will outwardly oscillate the lever about its pivot forcing the plunger and work piece outward. This outward movement of the work is limited by the V-shaped guide plate 68 supported by the bed intermediate the two discs. When such movement is limited, continued movement of the lever and roller will rock the cam inward away from its limiting stop, and increase the tension on spring 62. This movement will be for example, from the dotted line position indicated in Figure 4 to the full line position there shown.

As the rotation proceeds the work piece will be moved opposite the bevelled end 69 of guide plate 68 when the pressure of the cam against the lever will snap the injector 49 outward and the work will be pressed into the space between discs 42 and 46, being restrained against tangential movement relative to the discs by the beveled end of plate 68 and the surface of work rest plate 70, also carried by the bed. As the disc 46 is further rotated its surface 47 will then come into engagement with the work piece and the work will be pressed toward surface 43 of disc 42 and held as indicated in Figure 5.

When in this position, rotation of the discs 42 and 46 with their surfaces frictionally engaging the work will spin or rotate the work while the relative lateral adjustment of the two discs will space their upper surfaces a prescribed distance, corresponding with desired work diameter so that irrespective of the initial length of the work whether long or short, or the general section of cone which it may form whether near the base or the apex, a given frustro-conical portion will be peripherally supported and rotated between the two discs, said portion consequently having the projecting portion ground off in definite relation to said upper surfaces of the two discs. All articles produced by the process will have the terminal surfaces so produced in definite relation to a given diameter of the work piece.

The diameter of the two discs and their speed of rotation is such as to retain and spin the work therebetween a sufficient period of time to permit of proper grinding during a single revolution of the discs. As slot 48 approaches the work in grinding position, but prior to its arrival at this position, the notch 45 in disc 43 will be brought into alignment with the work releasing the pressure on one side thereof. At this same time ejector plunger 72 carried in socket 73 in disc 46 will be forced outward a prescribed limited amount by spring 74 kicking the work piece out of position between the surfaces 69 and 70 by way of notch 45 into discharge chute 75. This clears out the working position ready for reception of the next work piece, the respective position of the parts for ejection and introduction of work being best understood by comparison of Figures 3 and 4.

For performance of the grinding operation bed 25 is provided with a suitable column structure 76 having mounted thereon slide 77 in which is journaled the grinding wheel spindle 78 driven from suitable source of power as by belt 79. The position of this slide is preferably adjusted by screw 80 bearing worm gear 81 inmeshed with worm 82 at the top of the column rotatable by hand wheel 83. This facilitates adjustment of the vertical position of the wheel from the front of the machine.

Spindle 78 bears collet 84 for grinding wheel 85 and is mounted both for rotation and axial sliding movement in its bearings. This axial sliding movement is preferably attained through sleeve 86 slidably but non-rotatably mounted in grinding wheel slide 77 and coupled with the terminus of spindle 78 by the antifriction bearing structure 87 indicated in Figure 9. This sleeve provides attachment for lug 88 pivoted to one end of lever 89 having an arcuate slot 90 receiving the adjustable fulcrum screw 91 borne by lever 92, pivoted as at 93 to the slide 77. A vertical rock shaft 94 has an arm 95 coupled by pivoted block 96 with the furcated end 97 of lever 89 for oscillation thereof about fulcrum 91, the amount of reciprocation imparted to the pivot 98 of the lever 89 and consequently the degree of oscillation of the lever 89 and spindle 78 being dependant on the position of pin 91 in slot 90. Oscillation of the grinding wheel spindle in timed relation to the ejection and injection of work is affected by means of a cam 99 carried by disc 42 and engaging follower 100 on slide bar 101. The bar is urged in the direction of the cam by spring 102 and has a rack portion 103 meshing with pinion 104 near the lower end of the rock shaft. Consequently, back and forth movement of member 101, alternately effected by spring 102 and cam 99 will cause corresponding reciprocation of the grinding wheel spindle, alternately move the grinding wheel from a position laterally displaced from the work to a position overlying the work and reverse. This both facilitates insertion and removal of the work and also prevents any possible formation of grinding lines due to maintenance of the grinding wheel in an axially fixed position relative to the work. In Figure 12 of the drawing the general structure is the same as that just described with the exception that the grinding wheel 85 in place of having a plane or cylindrical peripheral grinding face as indicated in Figure 9 has a contoured face such that the portion 85' grinds on end of the roll at right angles to the axis thereof while it has a second portion 85" forming the second beveled surface 105 on the work. It will be understood that by different truings or contourings of the grinding wheel surface that half round or other terminal shapes can be produced on the work as desired. It will further be understood that since the essence of the invention is the utilization of a grinding member for operating on the work while held and rotated by the discs illustrated and described that either the face or the periphery of the grinding wheel could be alternately employed without in anywise varying the principles or operating mechanisms involved. As it is of particular importance that the work engaging surfaces 43 and 47 of the two controlling discs be similar in form, angle and the like in order that the surface produced may be normal to the axis of the work piece, use in constructing and maintaining these surfaces is preferably made of a special truing device such as shown in Figure 11. This device comprises a bracket 106 designed to be secured to the appropriate slide 27 or 28 as indicated in Figure 1, by screws or bolts 107 and 108. This bracket carries a transverse slide 109 shiftable by screw 110 in a direction toward and from the face of the disc to be trued. Pivoted to the slide is a sleeve 111 retained in desired angularly adjusted position by screw 112 and having keyed therein the plunger sleeve 113 which may be fed up and down past the surface of the disc 46 for example, by feed screw 114 actuated by hand wheel 115. This sleeve bears a suitable turning tool 116. Consequently, as the disc is rotated the tool may be moved down at the proper angle across the surface of the disc turning it off to prescribed angle and proper surface.

From the foregoing description considered in conjunction with the drawings, the operation of our improved machine should be readily understood and it will be seen that on power being suitably applied to the discs 42 and 46 and to the grinding wheel, it is merely necessary for the operator on each rotation of disc 46 to place a work piece in slot 48. Continued rotation of the parts will then permit the work piece to be introduced between the guides therefor, maintained at the proper height by engagement of the discs with diametrically opposed portions thereof, whereby the vertical movement is limited, friction engagement of the discs will impart a movement of the work piece about its true axis while the cam and spring will serve to reciprocate the grinding wheel across the exposed end of the work grinding it down until said end is at a proper distance from the prescribed diameter of the work piece so that the end may be utilized in maintaining and locating the roll in subsequent proper operative position in an anti-friction bearing or the like.

The grinding having been completed, the spring ejector 72 will serve automatically to throw out the finished work piece just prior to the injection of a new work piece with the result that a work piece is practically continuously in operative position within the machine and idle or non-grinding time of the machine is reduced to a minimum.

It will of course, be understood that while the present invention has been particularly described in conjunction with the grinding of tapered rolls that are therefore supported entirely by lateral engagement therewith, that by utilization of a bottom rest contoured face on the wheels or the like, any article of circular form in cross section within the size limits of the machine may be correspondingly, satisfactorily inserted, rotated and ground.

It will further be understood that in place of the work being held substantially on the common center line of the pair of driving discs as is indicated by Figure 3 for example that the work rest blade 70 may be so positioned, as indicated in Figure 13 for example that the work will be off-set as respects this center line so that it will be substantially wedged against the disc 42 by the bevelled edge 75 on the terminus of the feed slot in disc 46.

This will cause a tight 3-point engagement of the work between the 2 discs 42 and 46 and the angle top work rest 70 so that any possible canting or play of the work piece in any direction is eliminated. This entirely obviates the employment of member 79 as a steadying member for the work during the grinding will have to do solely with the function of a guide for the work as it is moved toward the grinding position.

It will further be noted that in this figure disc 46 has been shown of less diameter than disc 42 with the result that there will be a difference in the surface speeds of the peripheries of the two discs when their spindles are synchronously rotated, the slower moving disc 46 additional thrust firmly holds the work against the work rest member 120.

As has been mentioned the cam 99 serves to force rod 101 rearwardly and consequently to inwardly shift grinding wheel spindle and grinding wheel. Should it be desired to maintain the grinding wheel in inwardly pressed position overlying the work rest this may be effected by providing the slide bearing 122 therefor with a suitable clamp screw or other locking device 123 engaged in the collar 124.

Clamping of this member when the rod 101 is in rearward position will lock the member and consequently the grinding wheel in this adjusted position and the cam 99 may rotate freely without effecting the position of the parts until by loosening of clamp member 123 rod 101 is released rendering cam 99 and spring 102 successively effective.

We claim:

1. A grinding machine including a pair of opposed rotatable discs having their peripheries contoured to correspond with the work piece being operated upon, means for rotating the discs in a common direction about their axes at the same peripheral speed, means for supporting a work piece intermediate the discs for lateral engagement and rotation by the discs, the contoured portion of the discs limiting the axial movement of the work piece and a grinding member supported adjacent the work engaging means for operation on the work while rotated by the discs.

2. A grinding machine including a pair of peripherally opposed rotatable discs, means for rotating the discs in a common direction about their axes at the same peripheral speed, means for supporting a work piece intermediate the discs for lateral engagement and rotation by the discs, a grinding member supported adjacent the work engaging means for operation on the work while rotated by the discs, and means for automatically introducing a work piece into operative position between the discs.

3. A grinding machine including a pair of peripherally opposed rotatable discs, means for rotating the discs in a common direction about their axes at the same peripheral speed, means for supporting a work piece intermediate the discs for lateral engagement and rotation by the discs, a grinding member supported adjacent the work engaging means for operation on the work while rotated by the discs, one of said discs having a recess formed in the periphery thereof and means for ejecting a work piece as the recess passes thereby.

4. A grinding machine including a pair of peripherally opposed rotatable discs, means for rotating the discs in a common direction about their axes at the same peripheral speed, means for supporting a work piece intermediate the discs for lateral engagement and rotation by the discs, a grinding member supported adjacent the work engaging means for operation on the work while rotated by the discs, means for automatically introducing a work piece into operative position between the discs, and means for subsequently ejecting the work piece at the completion of the grinding operation.

5. A machine of the character described including a pair of opposed contoured surfaces traveling in opposite directions, means for rotatably supporting a work piece between and in lateral engagement with said surfaces whereby the work piece will be rotated thereby the contoured surfaces limiting the axial movement of the work piece, a grinding member and means for traversing the grinding member across the rotating work piece.

6. A machine of the character described, including a pair of peripherally opposed rotary discs adapted to receive and rotate a work piece there between, means for supporting a work piece between the discs, a grinding member for operation on the work piece while so supported, a work feeding mechanism, a grinding wheel reciprocating mechanism, and cam members associated with the discs for respectively actuating the work feeding and wheel reciprocating mechanisms.

7. A machine of the character described, including a bed, a pair of slides carried thereby, spindles journaled in the slides, rotary work engaging discs carried by the spindles and supported by the slides in peripheral opposition, work positioning means between said discs for supporting a work piece in joint engagement therewith, a column rising from the bed, a grinding wheel supported by the column and overlying the discs, and means for traversing the grinding wheel relative to the discs.

8. A machine of the character described, including a bed, a pair of slides carried thereby, spindles journaled in the slides, rotary work engaging discs carried by the spindles and supported by the slides in peripheral opposition, work positioning means between said discs for supporting a work piece in joint engagement therewith, a column rising from the bed, a grinding wheel supported by the column and overlying the discs, means for traversing the grinding wheel relative to the discs, said means including a cam member supported by and rotatable with one of the spindles, interpreting mechanism operatively associated with the cam including an oscillatable lever actuated by the cam and means coupling the lever with the grinding wheel spindle for reciprocation of the spindle.

9. A machine of the character described including a bed, a pair of slides carried thereby, spindles journaled in the slides, rotary work engaging discs carried by the spindles and supported by the slides in peripheral opposition, work positioning means between said discs for supporting a work piece in joint engagement therewith, a column rising from the bed, a grinding wheel supported by the column and overlying the discs, means for traversing the grinding wheel relative to the discs, said means including a cam member supported by and rotatable with one of the spindles, interpreting mechanism operatively associated with the cam including an oscillatable lever actuated by the cam, and means for varying the fulcrum of said lever to control the amount of reciprocating movement imparted to the spindle.

10. A machine of the character described, including a pair of peripherally opposed work rotating discs, a grinding member for operative engagement with a work piece supported by the discs and means for feeding a work piece into operative position between the discs including a plunger carried by the disc, an actuating arm for the plunger movable with the disc and a yieldingly mounted cam in the path of movement of the arm for resiliently, outwardly actuating the plunger.

11. A grinding machine including a pair of peripherally opposed rotatable discs adapted to receive a work piece therebetween, means for rotating the discs at a common peripheral speed, and with the opposed portions of their peripheries moving in opposite directions whereby they will jointly exert a rotating action on a work piece held in position thereby, one of said discs having a work ejection recess formed in the periphery thereof, the other of said discs having a kick-out member cooperating with the recess to eject a work piece when the recess causes disengagement of the work by the discs.

12. A grinding machine including a pair of peripherally opposed rotatable discs adapted to receive a work piece therebetween, means for rotating the discs at a common peripheral speed, and with the opposed portions of their peripheries moving in opposite directions whereby they will jointly exert a rotating action on a work piece held in position thereby, one of said discs having a work ejection recess formed in the periphery thereof, the other of said discs having a kick-out member co-operating with the recess to eject a work piece when the recess causes disengagement of the work by the discs, work positioning means projecting between the discs, and means mounted on one of the discs for presenting a work piece to said work positioning means and in position intermediate the discs immediately after the ejection of the preceding work piece.

13. In a machine of the character described, the combination with a pair of opposed work engaging members, of a work support projecting between the members having a contoured extension extending along the face of one of the members, said member having a work receiving slot formed therein, a work injecting plunger within the slot, and means for resiliently urging the plunger outward in the slot to press the work against the work support extension whereby the work piece will be automatically snapped into operative position between the work engaging members during its advance along its work support.

14. A machine of the character described including a pair of peripherally opposed rotary discs having opposed correspondingly contoured work engaging portions for automatically rotating and positioning a work piece therebetween, means preventing tangential displacement of the work as respects to the discs, a grinding member for terminal engagement with the work piece and means for supporting the grinding member in predetermined relation to the contoured work supporting surfaces whereby the grinding member will act uniformly on successive work pieces.

15. A machine of the character described, including a bed, a pair of slides carried by the bed, spindles journaled in the slides and each having a worm gear thereon, a splined shaft journaled in the bed, drive worms splined on the shaft and in mesh with the gears of the respective spindles, and means for adjusting the slides on the bed, whereby the worms will automatically follow their respective gears and relative rotary positioning of the spindles will be unaffected by sliding adjustment thereof.

16. A grinding machine of the nature described including a bed having ways, a pair of slides mounted on the ways for relative adjustment, work positioning discs rotatably supported by the slides, a column rising from the bed rearwardly of the ways, a slide supported by the column for adjustment toward and from the discs, a grinding wheel carried by the slide for operative engagement with a work piece supported by the discs and means for controlling the adjustment of the grinding wheel slide from the front of the machine including a feed screw journaled on the column and engaging the grinding wheel slide, a worm gear mounted on the screw, a worm meshing with said gear and having a forwardly extending shaft, and an operating handle for said shaft overlying one of the work supporting discs at the front of the machine.

17. A machine of the character described including a bed, a work supporting mechanism including a rotary spindle carried by the bed, a column rising from the bed, a slide carried by the column, means for adjusting the slide on the column, a grinding wheel spindle journaled in the slide for rotary and reciprocating movement, means for reciprocating the grinding wheel spindle including a rock shaft journaled in the column, means on the rotary spindle for oscillating the rock shaft on rotation of the spindle, a bracket carried by the slide, a lever pivotally supported by the bracket, means coupling the lever with the spindle, a rock arm splined on the rock shaft and coupled with the lever, and means on the bracket for sliding the splined arm along the rock shaft whereby the reciprocation will be imparted to the grinding wheel spindle irrespective of the adjustment of the slide on the column.

18. A machine of the character described including a bed, a work supporting mechanism including a rotary spindle carried by the bed, a column rising from the bed, a slide carried by the column, means for adjusting the slide on the column, a grinding wheel spindle journaled in the slide for rotary and reciprocating movement, means for reciprocating the grinding wheel spindle including a rock shaft journaled in the column, means on the rotary spindle for oscillating the rock shaft on rotation of the spindle, a bracket carried by the slide, a lever pivotally supported by the bracket, means coupling the lever with the spindle, a rock arm splined on the rock shaft and coupled with the lever, means on the bracket for sliding the splined arm along the rock shaft whereby the reciprocation will be imparted to the grinding wheel spindle irrespective of the adjustment of the slide on the column, and means for locking the grinding wheel spindle against reciprocating movement.

19. In a grinding machine the combination of a bed, means carried thereby for laterally engaging, supporting and frictionally rotating a work piece about an axis determined by the peripheral surface of the work piece, a rotating tool for operation on a terminal portion of the work piece to form same normal to the axis of rotation, and means for automatically positioning and ejecting the work piece relative to the supporting and rotating means.

20. In a grinding machine the combination of a bed, means carried thereby having travelling surfaces for laterally engaging the surface of a work piece to frictionally rotate same about an axis determined by said contacting surfaces, a rotating tool for forming a terminal portion of the work piece normal to its axis of rotation, means for advancing and retracting the tool across said terminal portion of the work piece, automatic means for positioning and ejecting a work piece relative to the travelling surfaces of the work rotating means, and synchronizing means for operating the automatic loading and ejecting means when the grinding wheel is in a retracted position.

21. In a grinding machine the combination of a bed, means having travelling surfaces for supporting and laterally engaging the surface of a work piece to frictionally rotate same about an axis determined by said contacting surfaces, a rotating tool for operation on a terminal portion of the work piece to form same normal to its axis of rotation, means for effecting a relative movement between the tool and work piece and means for automatically positioning and ejecting a work piece relative to the supporting rotating surfaces of the work driven means.

22. In a grinding machine the combination of a bed, means carried thereby for supporting and rotating a work piece, a rotating tool for operation on the work piece, a spindle for the tool, and means for advancing and retracting the spindle and tool relative to the work piece including a rotating cam, a cam follower, a rock shaft operated by the cam follower, and means oscillated by the rock shaft and connected with the spindle for converting the rocking motion of the shaft into axial movement of the spindle.

23. In a grinding machine the combination of a bed, means carried thereby for supporting and rotating a work piece, a rotating tool for operation on the work piece, a spindle for the tool, and means for advancing and retracting the spindle and tool relative to the work piece including a rotating cam, a cam follower, a rock shaft operated by the cam follower, a pivotally mounted member operated by the rock shaft and connected with the spindle for converting the rocking motion of the shaft into axial movement of the spindle, and means for varying the relation between the pivot of the member and its connection with the spindle for changing the length of stroke of the spindle.

In testimony whereof we affix our signatures.

GEORGE W. BINNS.
CLEMENT BOOTH.